Oct. 2, 1923.

T. W. QUIGLEY 1,469,459

GRAVE URN

Filed June 19, 1922

Inventor
Thomas W. Quigley.
By Harry D. Wallace
Attorney.

Patented Oct. 2, 1923.

1,469,459

UNITED STATES PATENT OFFICE.

THOMAS W. QUIGLEY, OF SYRACUSE, NEW YORK.

GRAVE URN.

Application filed June 19, 1922. Serial No. 569,483.

*To all whom it may concern:*

Be it known that I, THOMAS W. QUIGLEY, a citizen of the United States, residing at Syracuse, in the county of Onondaga and State of New York, have invented certain new and useful Improvements in Grave Urns, of which the following is a specification.

This invention relates to grave urns, and has for its object to provide a novel and simple tomb-like covering for graves, with which is combined the feature and function of an urn, in which flowers, light shrubs, and various other plants and grasses may be grown. A further object is to provide a combined grave covering and urn, whose length and breadth are greater than the grave opening, which may be placed over a new grave immediately after the latter has been filled in, and which not only protects the grave from being flooded during rain storms and thereby causing the lightly packed filling to settle, but also affords ready and convenient means for planting and cultivating live flower and plant decorations, which cannot be destroyed by the settling of the filling. A further object is to provide a durable tomb and urn comprising either metal or lithoid, and being so constructed as to provide a relatively large sunken top or crater, which may be filled with soil suitable for growing blooming or decorative plants and grasses commonly found in cemeteries, the earthy filling of said crater forming a permanent cultivable bed, and the said urn tending to ornament the grave, and at the same time serving as a protection against erosion or crumbling of the mouth of the grave due to the action of the elements. And a further object is to provide means for suitably draining the earth-filled portion of the urn and thereby preventing injury to the flowers and plants due to excessive moisture.

I attain these objects by the means set forth in the detailed description which follows, and as illustrated by the accompanying drawing, in which—

Figure 1:
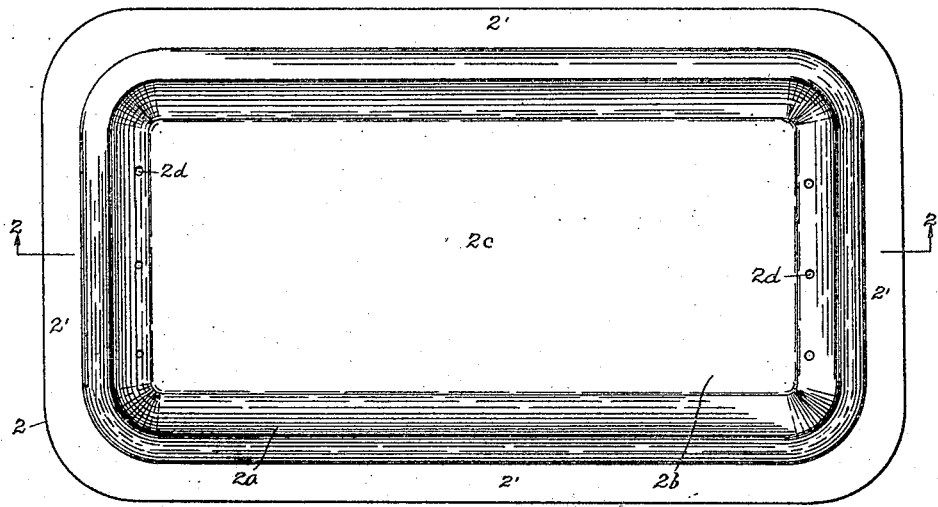
Figure 2:
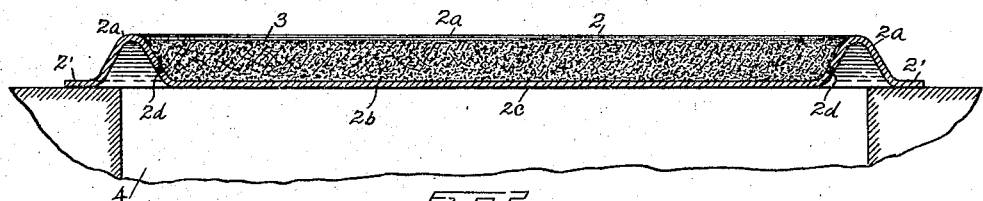
Figure 3:
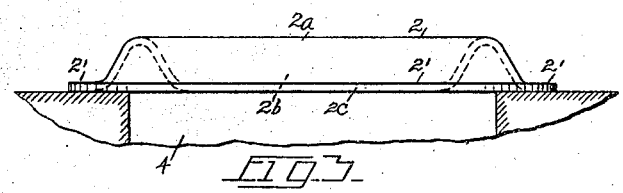
Figures 4, 5:
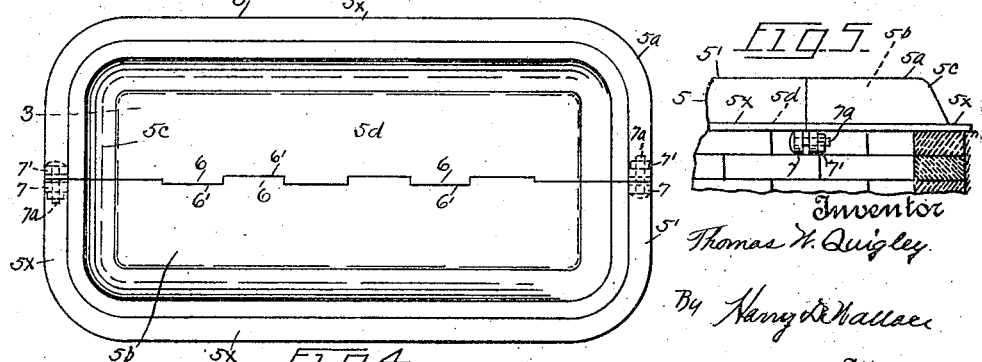

Figure 1 is a top-plan view of the combined urn and cover. Fig. 2 is a central longitudinal section, taken on line 2—2 of Fig. 1 and showing the device in its operative position on a grave. Fig. 3 is an end elevation of the same. Fig. 4 is a modified form of the device; showing the body split lengthwise; also showing means for securing the halves together. And Fig. 5 is a broken end elevation of the same.

In the drawing, 2 represents the combined urn and grave covering, which is preferably substantially rectangular in plan for conforming to the shape of a grave, and which may be made of metal, stone, or any of the well-known lithoidal substances of artificial make. In the preferred form of the device, the body 2 is made in one part, as shown in Figs. 1, 2 and 3, and the device is usually made in several sizes for covering graves of different length and breadth. $2'$ represents a continuous substantially horizontal flange, which surrounds a continuous hollow upwardly facing rib or boss $2^a$, the latter forming a rectangular depression or crater $2^b$, which is provided with a substantially level bottom $2^c$, the said bottom preferably being in the same plane as the flange $2'$. As shown in Fig. 2, the crater $2^b$ is intended to be filled with earth or soil 3, suitable for planting and nurturing flowers, light shrubs, and various plants and grasses usually grown upon or near graves. The length and breadth of the urn is preferably such that, when the body 2 is placed over a grave, as 4, the endless flange $2'$ rests firmly upon the solid earth which forms the four walls of the grave, as shown in Figs. 2 and 3. The rib $2^a$ is preferably made hollow so as to render the urn light and easy to handle. After a body has been interred, and the grave is filled in and leveled off, the urn 2 may be immediately placed over the mouth of the grave, as shown in Figs. 2 and 3. This effectually protects the newly filled grave from being flooded, and also prevents the caving of its walls during and after heavy rain falls, and besides lends a finished and ornamental appearance to the burial plot. By the provision of the symmetrical crater or cavity $2^b$, which may be filled with the soil 3, seasonal flowers, shrubs, and the like, may be immediately planted, without danger of the settling of the filling destroying or hindering the growth of the same. In practice, the urn 2 is applied to the grave immediately after it is filled in, and needs only to be removed occasionally to take care of the natural and usual settling. This latter work is essential, in order to prevent the mouth of the grave from caving in, and thereby weakening or destroying the support for the urn. The soil in the crater $2^b$ being exposed to the elements generally receives adequate moisture from the frequent rains, but the bed 3 may also be watered artificially, the same as any other urn or flower-pot. In order to prevent the crater 2<sup>b</sup> from being flooded and made too wet for the flowers and plants, due to heavy or continuous rain falls, I provide a number of perforations 2<sup>d</sup> in the sloping ends of the crater, which effect the proper draining of the bed 3. These drainage openings are preferably disposed some distance above the plane bottom 2<sup>c</sup>, so as to insure the retention of sufficient moisture to keep the flowers and plants in healthy condition. It will be noted that the drainage openings 2<sup>d</sup> extend through the inner wall of the hollow rib so that the moisture passing therethrough will not run over the exterior surface and stain the same.

In Figs. 4 and 5 I have shown a modified structure, wherein the urn 5 is split substantially in the line of its longitudinal center, for providing similar sections 5'—5<sup>a</sup>. This construction and arrangement greatly facilitates the making and handling of the larger sizes, particularly when the urn is made out of iron or stone. The urn 5 has a similar crater or depression 5<sup>b</sup>, for holding the earth 3, and this crater is surrounded by a similar continuous rib 5<sup>c</sup>. In order to facilitate the assembling and registering of the two main sections of the split urn, I provide their meeting edges with a number of correspondingly formed tongues and sockets 6—6', which extend substantially the length of the bottom 5<sup>d</sup>. To further aid in holding the sections 5'—5<sup>a</sup> together, I provide similar depending perforated lugs 7—7' at the ends of the sections, to which bolts 7<sup>a</sup> are applied for rigidly holding the sections together. These lugs are preferably disposed at the undersides of the flanges 5<sup>x</sup>, so as to leave the said flanges free and clear of obstructions, and when the urn is placed over a grave, the said lugs are readily forced into the relatively soft earth by the weight of the urn. The provision of the relatively level and free flanges 2' and 5<sup>x</sup>, facilitates the use of a lawn-mower for mowing the grass close to the urn, and at such times one of the wheels of the lawn-mower usually travels over the said flange.

When my improvement is applied to brick or concrete lined graves, the flanges 2'—5<sup>x</sup> usually rest upon the top-most courses of the masonry, as shown in Fig. 5.

Having thus described my invention, what I claim, is—

1. A combined urn and grave covering comprising an oblong body having an upwardly facing hollow rib surrounded by a continuous flange and encircling a crater adapted to be filled with soil and the bottom of said crater and said flange being substantially in the same plane.

2. A combined urn and grave covering, comprising an oblong body having an upwardly facing rib surrounded by an endless flange, the portion of said body inclosed by said rib comprising a crater adapted to be filled with soil, and means for partially draining said crater consisting of openings leading through the inner wall of said rib and opening beneath the body.

3. A combined urn and grave cover, including an oblong body comprising an endless horizontal flange, and a continuous concavo-convex rib rising above said flange and forming an oblong cavity adapted to be filled with soil for growing blooming and plant decorations, the rib being open on its under side.

4. In a combined urn and grave covering, a body having an oblong depression formed by a continuous upwardly projecting rib, said depression having a plane bottom, and a continuous flange projecting outwardly from said rib, and said flange being spaced from said bottom the breadth of said rib, the inner wall of the rib being formed with drain openings to permit moisture draining from the depression through the hollow rib.

5. In a grave cover, a substantially rectangular body of greater area than the grave opening, the side and end margins of said body comprising a horizontal flange arranged in a common plane, the medial portion of said body being formed with a depression which is separated from said flange by a concentric hollow rib and adapted to be filled with soil for growing and cultivating flowers and plants, the inner wall of the rib being formed with drain openings to permit moisture draining from the depression through the hollow rib.

6. In a grave cover, a body adapted to close the mouth of a grave, said body having an oblong depression in its top side formed by an endless rib, and a continuous flange extending horizontally away from said rib and serving to support the body at the four sides of the grave's mouth.

In testimony whereof I affix my signature.

THOMAS W. QUIGLEY.